United States Patent
Adamski

(10) Patent No.: US 9,893,743 B2
(45) Date of Patent: Feb. 13, 2018

(54) LOW-NOISE BLOCK DOWNCONVERTER AND METHOD FOR THE SAME

(71) Applicant: ADVANCED DIGITAL BROADCAST S.A., Eysins (CH)

(72) Inventor: Artur Adamski, Zielona Gora (PL)

(73) Assignee: ADVANCED DIGITAL BROADCAST S.A., Eysins (CH)

( * ) Notice: Subject to any disclaimer, the term of this patent is extended or adjusted under 35 U.S.C. 154(b) by 0 days.

(21) Appl. No.: 15/489,759

(22) Filed: Apr. 18, 2017

(65) Prior Publication Data

US 2017/0302302 A1 Oct. 19, 2017

(30) Foreign Application Priority Data

Apr. 18, 2016 (EP) ..................................... 16165773

(51) Int. Cl.
| | |
|---|---|
| *H04B 1/26* | (2006.01) |
| *H04B 1/00* | (2006.01) |
| *H04H 40/90* | (2008.01) |
| *H04B 1/04* | (2006.01) |
| *H04B 1/18* | (2006.01) |
| *H04B 1/28* | (2006.01) |
| *H04B 7/185* | (2006.01) |
| *H01Q 1/24* | (2006.01) |

(52) U.S. Cl.
CPC ............. *H04B 1/006* (2013.01); *H01Q 1/247* (2013.01); *H04B 1/04* (2013.01); *H04B 1/18* (2013.01); *H04B 1/28* (2013.01); *H04B 7/185* (2013.01); *H04H 40/90* (2013.01); *H04B 2001/0491* (2013.01)

(58) Field of Classification Search
USPC ......................................................... 455/313
See application file for complete search history.

(56) References Cited

U.S. PATENT DOCUMENTS

| | | | | |
|---|---|---|---|---|
| 7,522,875 | B1 * | 4/2009 | Gurantz ................. | H04H 40/90 455/179.1 |
| 8,121,550 | B2 * | 2/2012 | Goldblatt ........... | H04B 7/18517 455/63.1 |
| 2007/0098121 | A1 * | 5/2007 | Casabona .......... | H04B 7/18513 375/346 |

(Continued)

*Primary Examiner* — Lana N Le
(74) *Attorney, Agent, or Firm* — Mark M. Friedman

(57) ABSTRACT

An LNB downconverter comprising: two LNBs configured to receive their respective satellite signals: the first and second LNB being configured to output, four IF signals of different polarization and frequency range to a respective first and second Cross-bar Switch (CBS); wherein the first and second CBS, are configured to accept four RF inputs, and routing them, to any of four outputs, as configured by a Controller: wherein outputs of CBSs are connected to respective Satellite Channel Routers (SCRs) configured by the Controller to shift the frequency of their input signals to fixed intermediate frequencies; wherein outputs of SCRs are connected to respective Band Pass Filters (BPFs) whereas the fixed intermediate frequencies of SCRs are different and wherein the band passed by each BPF is non-overlapping; an Adder adding the signals on different frequencies, output by each BPF, to form a single output signal comprising data from both satellite signals.

13 Claims, 15 Drawing Sheets

(56) References Cited

U.S. PATENT DOCUMENTS

| | | | |
|---|---|---|---|
| 2009/0102706 A1* | 4/2009 | Goldblatt | H04B 7/18517 342/352 |
| 2009/0254955 A1* | 10/2009 | Petruzzelli | H04N 21/2383 725/105 |
| 2011/0059690 A1* | 3/2011 | Petruzzelli | H04H 40/90 455/3.02 |
| 2012/0099623 A1* | 4/2012 | Petrovic | H04B 1/28 375/211 |

* cited by examiner

LOW-NOISE BLOCK DOWNCONVERTER AND METHOD FOR THE SAME

TECHNICAL FIELD

The present invention relates to a low-noise block downconverter (LNB) and method for the same. In particular the present invention relates to a method of DVBS (Digital Video Broadcasting—Satellite) reception of multiple tuner device(s) from two satellite orbital positions using a single LNB device and single coaxial cable from the dish to the device. It is a simplification proposal of currently known satellite installations in terms of both: complexity reduction and costs efficiency.

BACKGROUND OF THE INVENTION

Prior art defines a single cable distribution technology (Unicable) allowing DVBS broadcast delivery to multiple receivers via single coaxial cable. Currently available systems allow for all four Ku sub-bands reception using LNBs that translate only the user requested transponder to a predetermined fixed frequency within 950-2150 MHz band. This allows independent tuning across the whole IF range of one orbital satellite reception for each tuner.

In order to simultaneously receive a broadcast signal from two orbital satellites, a complex installation is required comprising two Quattro LNB's and a multiswitch operating in the Unicable technology. Such configuration allows for doubling all four Ku sub-hands reception (from two satellites) simultaneously, feeding eight tuner receivers independently with two satellites broadcast content delivery. Such installation, however, requires a lot of components necessary for proper DVBS signal handling and distribution, namely:

(A) Two specific Quattro LNB's (each dedicated for each satellite) with their mechanical support system. Quattro LNB's are required to deliver four Ku bands of each satellite independently;

(B) Eight coaxial cables connecting Quattro LNBs (mounted on the dish) with a Multiswitch usually placed far away from dish;

(C) the Multiswitch device, operating in the Unicable technology and supporting the DiSEqC (Digital Satellite Equipment Control) protocol.

Such installation is complex, inconvenient and expensive for the end user as shown in FIG. 1A-B where eight user bands (UB) are used.

Other known device, allowing for simultaneous reception of the two satellite orbital positions, is a Monoblock LNB. It consists of two independent LNBs in a single chassis mounted in a fixed position with respect to each other (usually as 6 deg or 4.3 deg). Various types of Monoblock LNBs exist (single, dual, quad, etc . . . ), allowing DVBS reception with multiple tuner devices, but each tuner device requires its own coaxial cable, what makes the installation again complex and inconvenient for the end user.

The aim of the development of the present invention is an improved and cost effective low-noise block downconverter (LNB) and method for the same.

SUMMARY AND OBJECTS OF THE PRESENT INVENTION

A first object of the present invention is a method for operating a low-noise block downconverter, the method comprising the steps of: receiving a first satellite signal from a first LNB block and receiving a second satellite signal from a second LNB block; outputting, from each of the first and second LNB blocks, four IF signals of vertical polarization low frequency, vertical polarization high frequency, horizontal polarization low frequency, horizontal polarization high frequency to a respective first and second Cross-bar Switch; at each of the first and second Cross-bar Switch, accepting four RF inputs, and routing the inputs, to any of four outputs, as configured by a control signal governed by a Controller; connecting each output of the first and second Cross-bar Switch to a respective Satellite Channel Router (SCR) configured by the Controller to shift the frequency of its input signal to a fixed intermediate frequency; filtering output of each Satellite Channel Router with a respective Band Pass Filter (BPF) wherein the fixed intermediate frequency of each Satellite Channel Router is different and wherein the band passed by each Band Pass Filter is non-overlapping; adding, by an Adder, the signals on different frequencies output by each Band Pass Filter in order to form a single output signal comprising data from the first satellite signal and the second satellite signal.

A second object of the present invention is a low-noise block downconverter comprising: a first LNB block configured to receive a first satellite signal and a second LNB block configured to receive a second satellite signal; the first and second LNB blocks being configured to output, four IF signals of vertical polarization low frequency, vertical polarization high frequency, horizontal polarization low frequency, horizontal polarization high frequency to a respective first and second Cross-bar Switch; wherein the first and second Cross-bar Switch, are configured to accept four RF inputs, and routing the inputs, to any of four outputs, as configured by a control signal governed by a Controller; wherein each output of the first and second Cross-bar Switch is connected to a respective Satellite Channel Router configured by the Controller to shift the frequency of its input signal to a fixed intermediate frequency; wherein output of each Satellite Channel Router is connected to a respective Band Pass Filter whereas the fixed intermediate frequency of each Satellite Channel Router is different and wherein the band passed by each Band Pass Filter is non-overlapping; an adder, configured to add the signals on different frequencies, output by each Band Pass Filter, in order to form a single output signal comprising data from the first satellite signal and the second satellite signal.

Preferably, the single output signal is formed according to the Unicable technology.

Preferably, the center frequencies of user bands are the following: 1076, 1178, 1280, 1382, 1484, 1586, 1688 and 1790 MHz.

Preferably, the Controller is configured to manage tuner's requests, satellite and transponder selection and channels allocation.

Preferably, the first and second LNB blocks are identical.

Preferably, the first and second LNB blocks are identical and each comprise a first and a second sub-LNB block with an alternate polarization.

Preferably, the first and second Cross-bar Switch are each a single layer, non-blocking type switch.

Preferably, each Satellite Channel Router is configured to shift a receiver device requested transponder comprising a user requested channel, to a fixed frequency of User Band, which is thereafter provided for reception by a tuner receiver.

Preferably, the outputs of the Satellite Channel Routers provide eight independent narrow band outputs, comprising user requested transponders, each located on a different fixed frequency User Band.

Preferably, the Controller comprises a Command Interpreter Module (CIM) configured to receive and interpret a channel change request from an external tuner device.

Preferably, the channel change request is sent using DiSEqC commands.

Preferably, each Band Pass Filter outputs a narrow band signal comprising a selected transponders data.

BRIEF DESCRIPTION OF THE DRAWINGS

These and other objects of the invention presented herein, are accomplished by providing a low-noise block downconverter (LNB) and method for the same. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

Figure 1A:
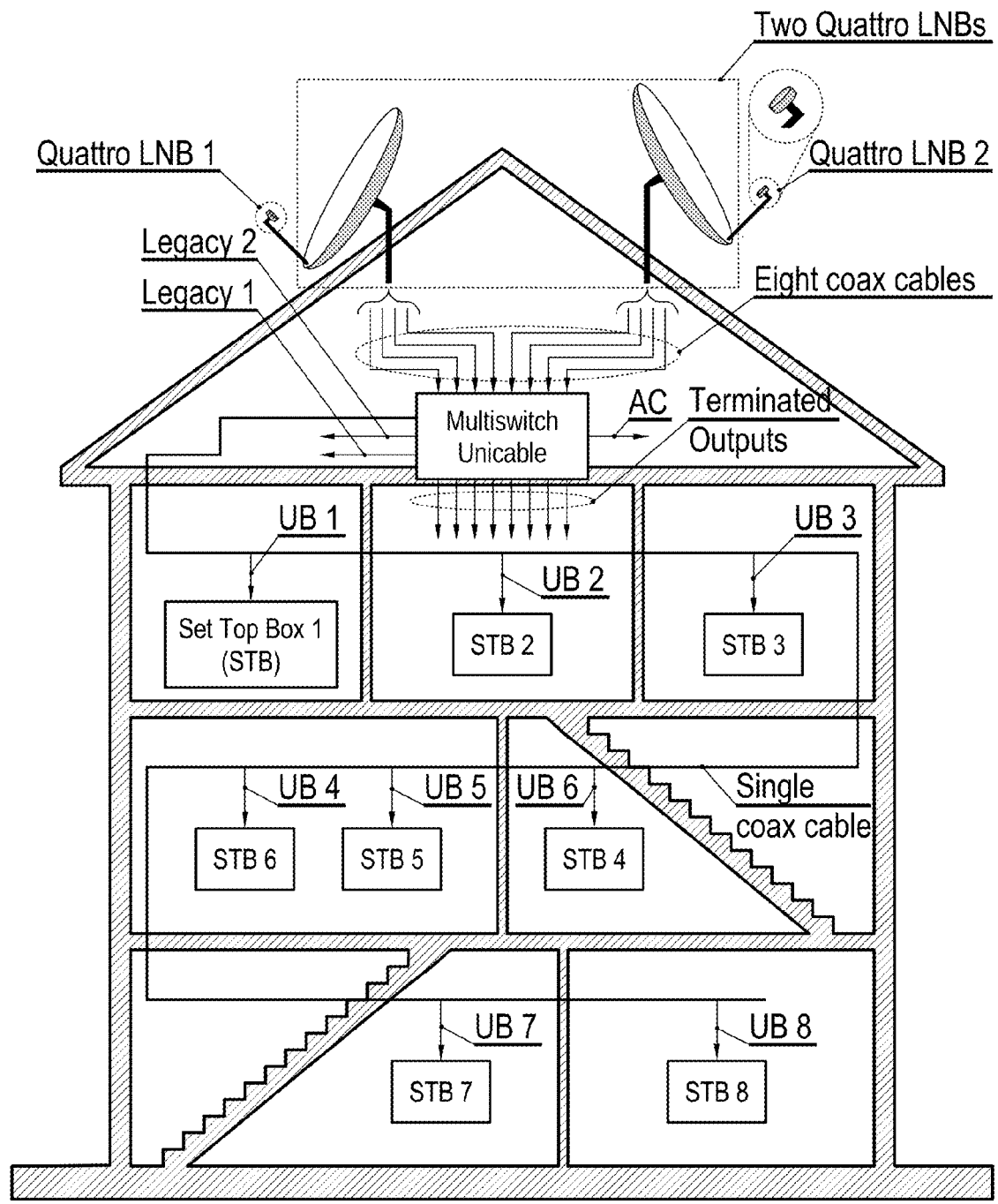
FIG. 1A-B present a diagram of a prior art system.
Figure 1B:
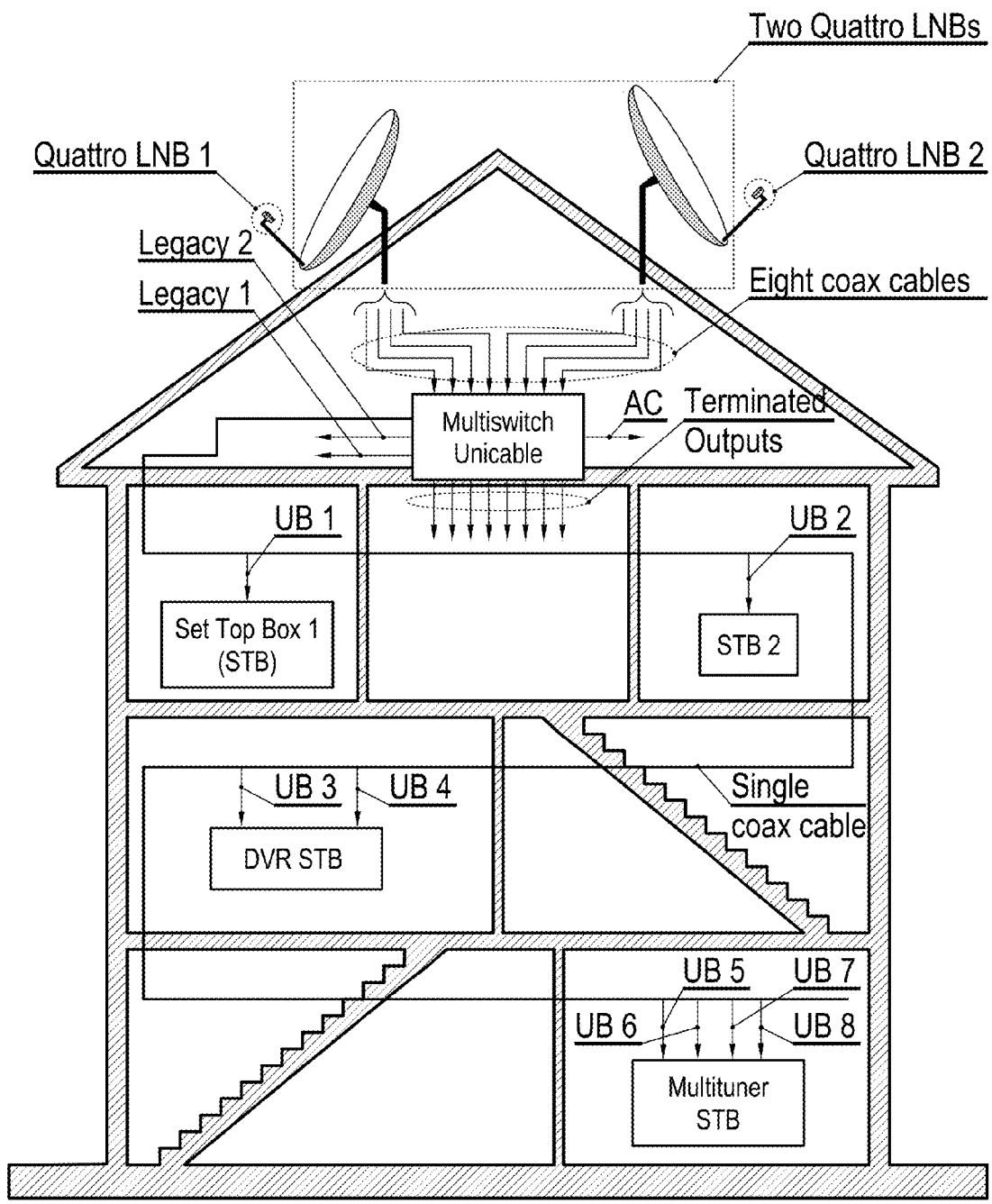

Based on the current state of technology of Monoblock LNB, it would be beneficial to combine it with Unicable LNB, thereby creating a universal combination of Unicable Monoblock LNB, which allows for the same functionality as shown in FIG. 1A-B but using only single LNB device connected via single coax cable.

Figure 2A:
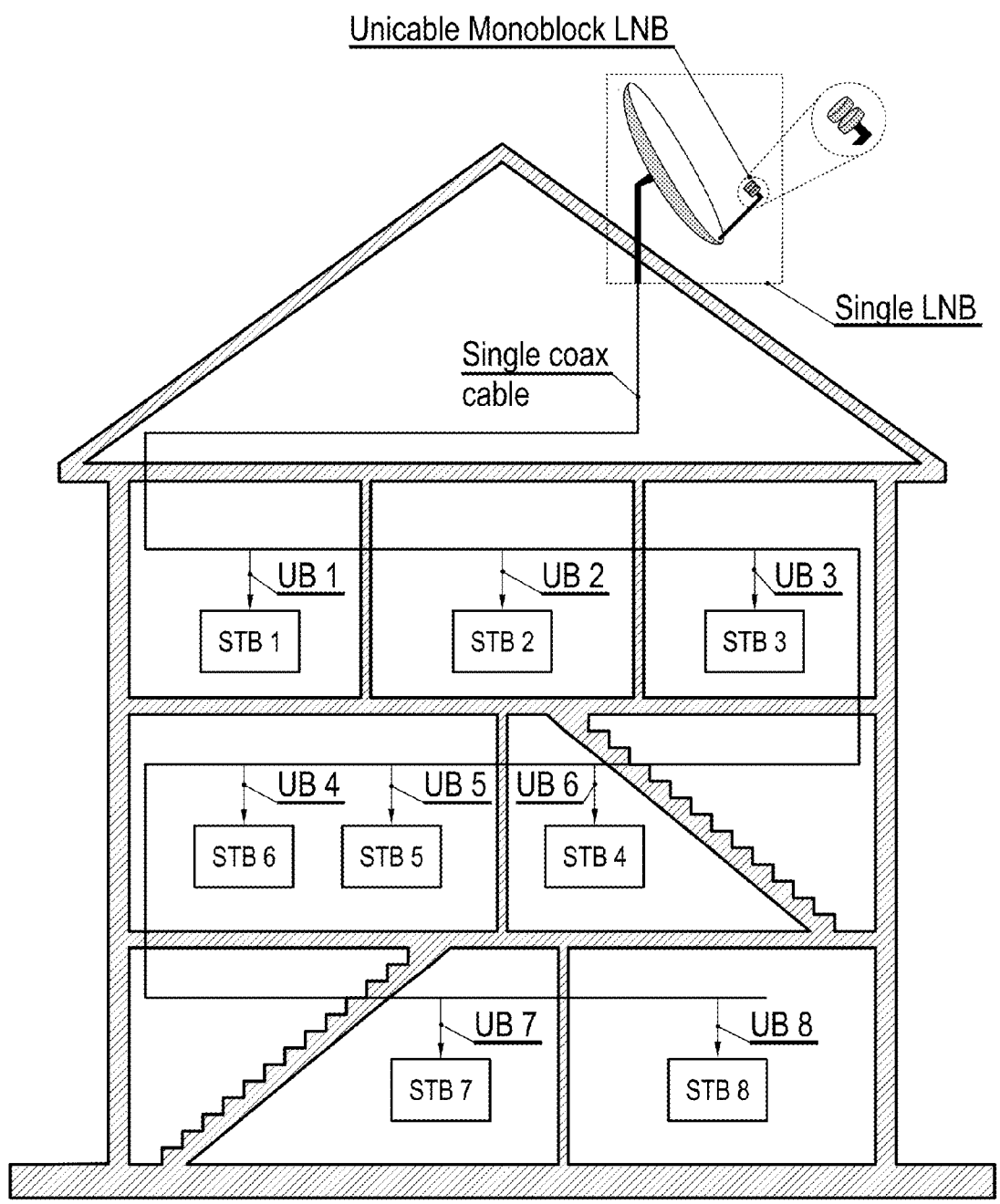
FIG. 2A-B present a diagram of a simplified DVBS installation, according to the present invention.
Figure 2B:
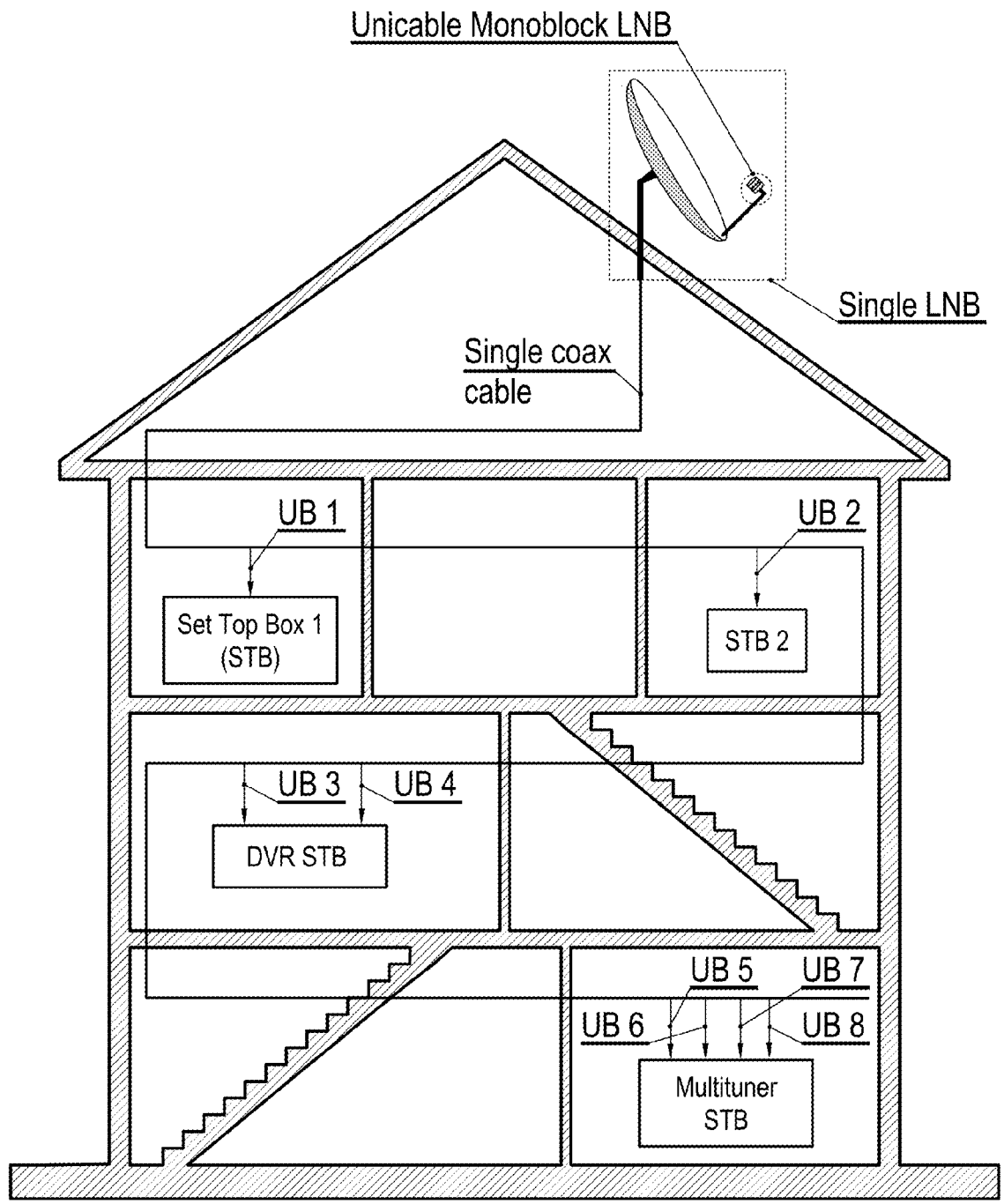

Such a configuration extremely simplifies the installation, making it more convenient and less expensive for the end user, as shown in FIG. 2A-B. FIG. 2A differs from FIG. 2B in that in FIG. 2B there are devices (eg. DVR STB) that use more than one user band (UB).

The Unicable Monoblock LNB would normally operate as a typical Monoblock LNB with the extension of Unicable technology. This would allow for doubling all four Ku sub-bands reception (from two satellites) simultaneously, feeding eight-tuner receivers independently with two satellites broadcast content delivery.

This, in turn would allow independent tuning across the whole IF range of two orbital satellites reception for each tuner.

Operating principle of the Unicable Monoblock LNB is based on the Unicable standard (EN 50494), where desired satellite transponders are translated into user bands (UB) that are allocated accordingly to the tuner receivers in the customer's installation.

Such translation of transponders occurs in the Unicable Monoblock LNB and is realized by special semiconductor chips called Satellite Channel Routers. The chips translate the user requested transponder to a predetermined fixed frequency within a 950-2150 MHz band. Examples of center frequencies of user bands are the following: 1076, 1178, 1280, 1382, 1484, 1586, 1688 and 1790 MHz. Nevertheless, different center frequencies may be chosen.

Figure 3:
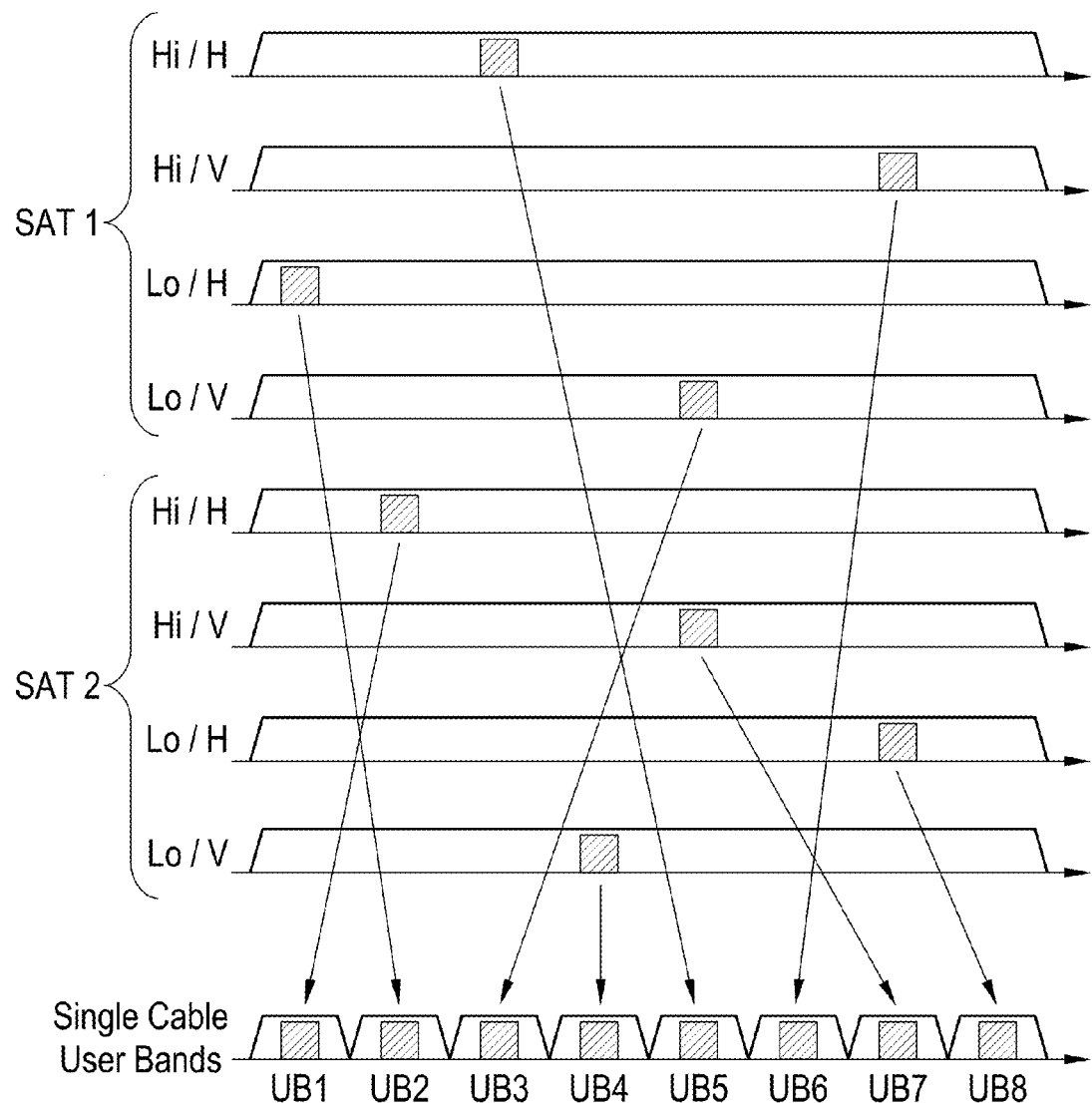
FIG. 3 presents an operating principle of a Unicable Monoblock LNB according to the present invention.

The tuner receiver transmits specific DiSEqC commands to the Unicable Monoblock LNB to allocate the desired satellite transponder to dedicated user band. The switching supports two satellite feeds, giving the full coverage of entire IF range (four frequency bands: H/V—horizontal/vertical polarization and Hi/Lo—high/low band) of the two satellites (SAT1, SAT2) simultaneously in a signal carried by a single coax cable as shown in FIG. 3.

Figure 4:
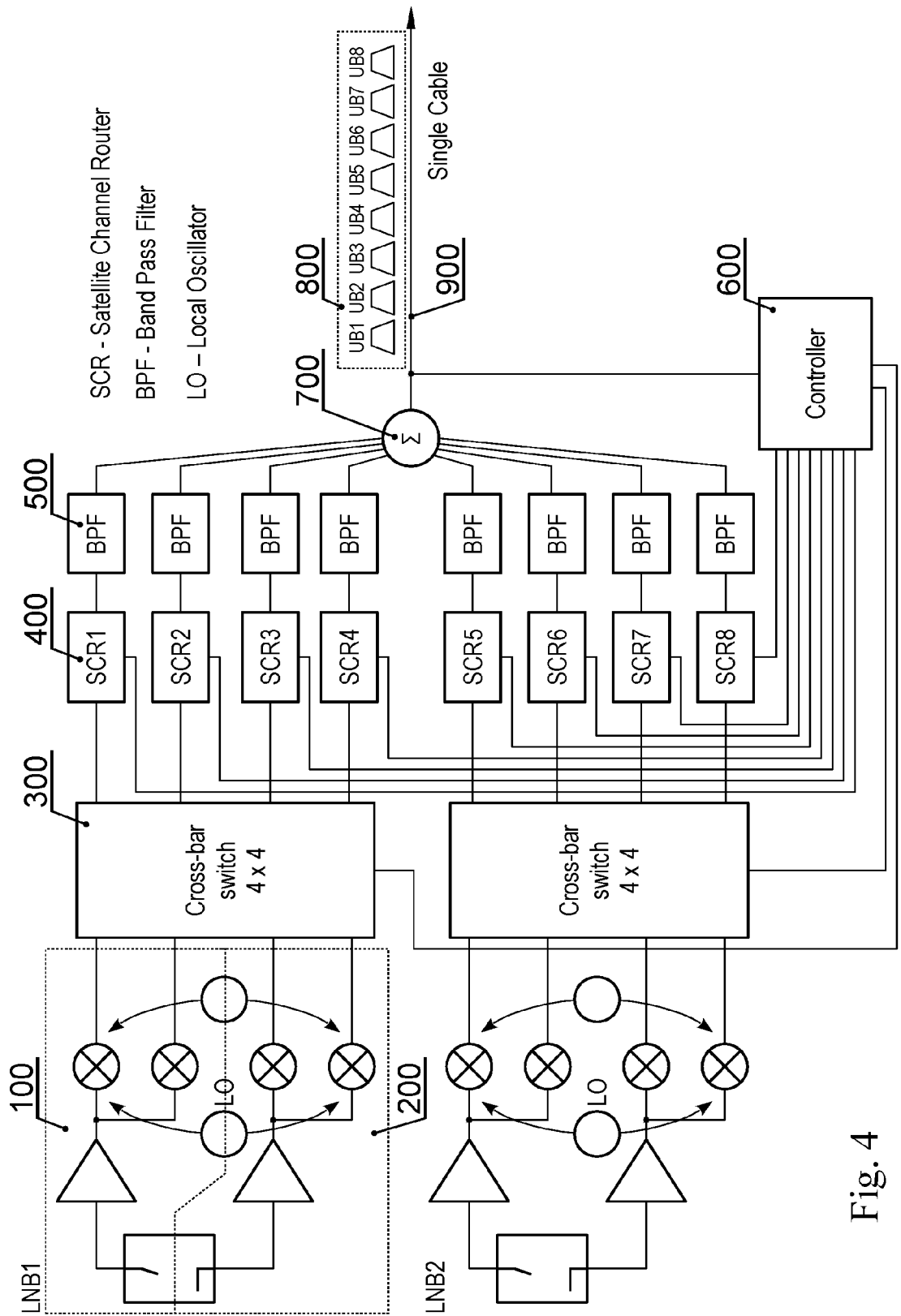
FIG. 4 shows details of the Unicable Monoblock LNB.

The principle of the Monoblock operation in Unicable technology is based on classical operation principle of Quad Monoblock LNB as shown in FIG. 4. There are two independent blocks with feedhorns, each dedicated for each satellite (First LNB and Second LNB). The double set of Local Oscillators (LO) is feeding the two switch inputs with entire satellite frequency range (H/V polarization and Hi/Lo band), giving the full coverage of the entire Ku spectrum simultaneously.

A Controller (based for example on a Micro-Controller Unit (MCU), which is a small computer (SoC—System On Chip) on a single integrated circuit comprising a processor core, memory, and programmable input/output peripherals) is responsible for communication with the multi tuner device(s) and manages requests of channels selection. Unlike the classical Quad Monoblock, the Satellite Channel Routers (SCR), controlled by MCU allocate the eight selected transponders into specified eight user bands (UB).

Each of eight selected channels, allocated on a defined frequency, is further processed by an appropriate Band Pass Filter (BPF) and further mixed into single cable signal, resulting in single cable distribution of eight desired channels.

The Unicable Monoblock LNB comprises two LNB blocks (a first LNB block and a second LNB block, which are identical). Each of the first LNB block and the second LNB block comprises two sub-LNB blocks (a first sub-LNB block (100) and a second sub-LNB block (200) with alternate polarization).

The first sub-LNB block and the second sub-LNB block on the front of a satellite dish (100, 200) receive a very low level microwave signal from the satellite (10.70-12.75 GHz), amplifie it and change the signals to a lower frequency band (950-2150 MHz). The output of the first and the second sub-LNB blocks are the four IF signals of each band and polarization. Details of this section have been presented in FIG. 5 and FIG. 6.

Unlike the classical Unicable LNB, the two identical blocks (the first LNB block and the second LNB block) are required for two simultaneous satellites reception (LNB1, LNB2). These output signals are directed to a 4×4 Cross-bar Switch (300—shown in FIG. 7A-D) and are further passed to Satellite Channel Routers SCR (400—shown in FIG. 8).

The SCR network chooses receiver-requested transponder and shifts it to one of the eight channels (User Bands—UB) in IF band (800). A Band Pass Filter BPF (500) is used to eliminate unwanted shifter output products. The signals output from SCR networks are summed up by an Adder (700—shown in FIG. 9) into one combined signal (800) that is sent via a single cable (900).

The control over the whole converting process is exercised by a Controller (600), which manages the tuner receiver requests (DiSEqC command interpretation), satellite and transponder selection (Cross-bar Switch Control) and channels allocation (SCR Control).

The arrangement shown in FIG. 3 and FIG. 4 allows for: (A) reception of all polarizations and bands of two orbital satellite positions via a single cable directly from the Unicable Monoblock LNB; (B) full coverage of entire IF range of the two satellites simultaneously (no channels limitation) in one Unicable Monoblock LNB for eight tuners; (C) simplification of LNB installation by eliminating the use of two Quattro LNB's in favor of one; and (D) significant simplification of cable installations by removing the necessity of multiswitches usage and multiple coaxial cables.

Figure 5:
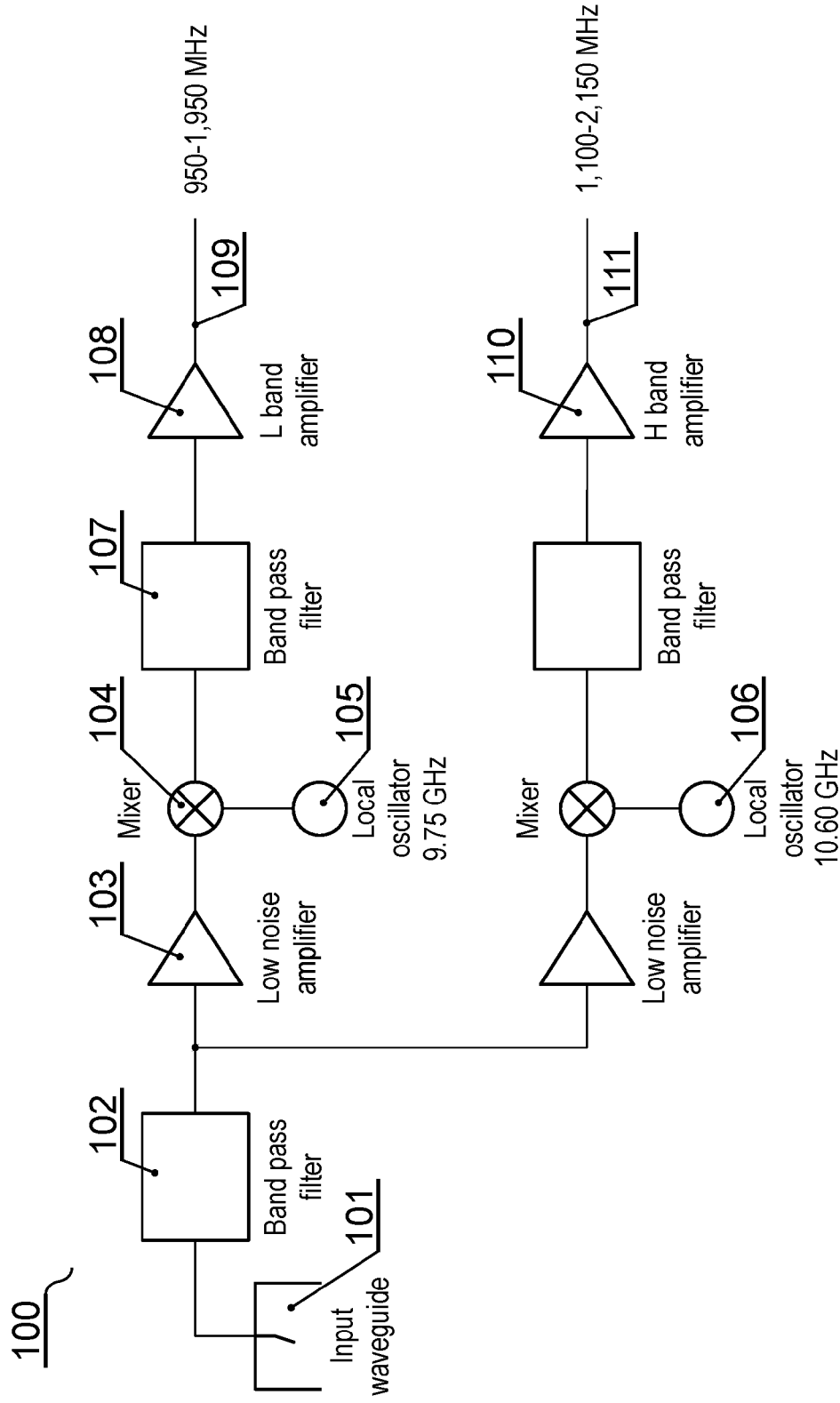
FIG. 5 and FIG. 6 provide details of a sub-LNB block.
Figure 6:
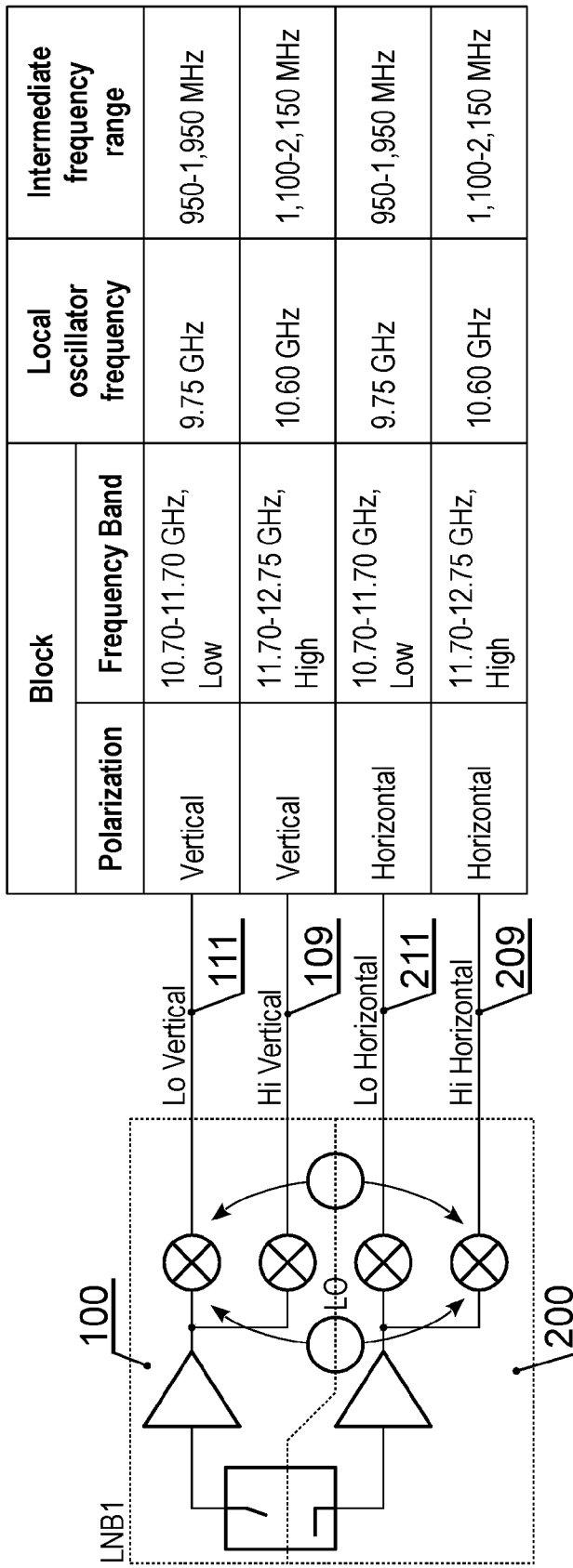

FIG. 5 and FIG. 6 provide details of the sub-LNB block (100). FIG. 5 shows the sub-LNB block (100). It begins with an input waveguide (101), which is connected to the collecting feed or horn. As shown, there is a special pin, through a printed broad side of the waveguide, that depending on its orientation extracts the vertical or horizontal polarization signals as an electrical current.

The satellite signals first go via a Band Pass Filter (102), which only allows the intended band of microwave frequencies to pass through. The signals are then split respectively into two signals and amplified by Low Noise Amplifiers (103) and further the signals are passed to a Mixer (104).

At the Mixer, all that has come through the Band Pass Filter and Amplifier stage is severely scrambled up by a powerful Local Oscillator signal (105, 106) in order to generate a wide range of distorted output signals. There are preferably two different Local Oscillators on board. One operating at 9.75 GHz (105) dedicated for Low Band frequency output (109) and second one operating at 10.6 GHz (106) dedicated for High Band frequency output (111).

After mixing the signals include additions, subtractions and multiples of the wanted input signals and the Local Oscillator frequency. Amongst the Mixer output products are the difference frequencies between the wanted input signal and the Local Oscillator frequencies, which are the ones of interest. A second Band Pass Filter (107) selects these and feeds them to the output Amplifier (108, 110) and further into the Cross-bar Switch (300).

A second similar sub-LNB block, with an alternate polarization (200), completes the entire spectrum thereby giving, at the LNB block's output, four IF signals of each band and polarization as shown in FIG. 6.

Figure 7A:
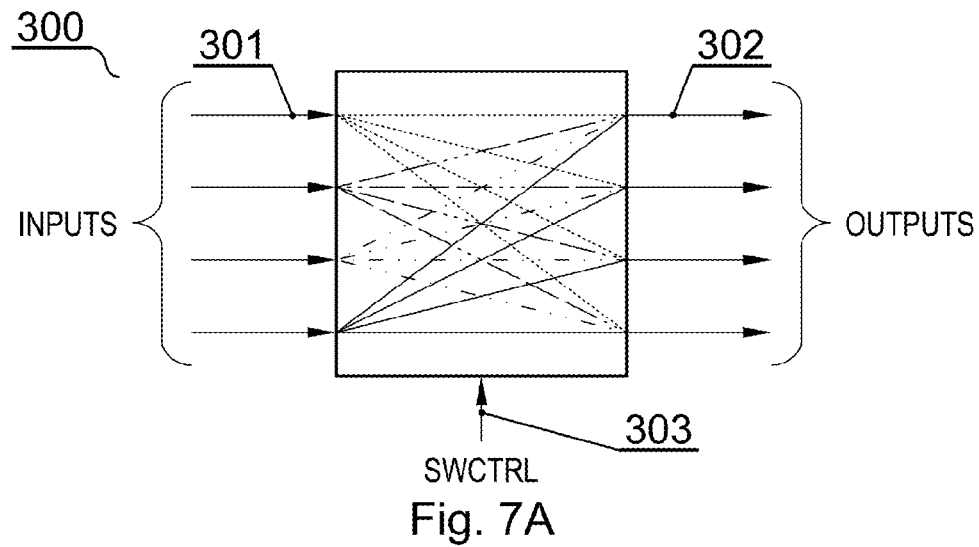
FIGS. 7A-D depict a Cross-bar Switch.
Figure 7B:
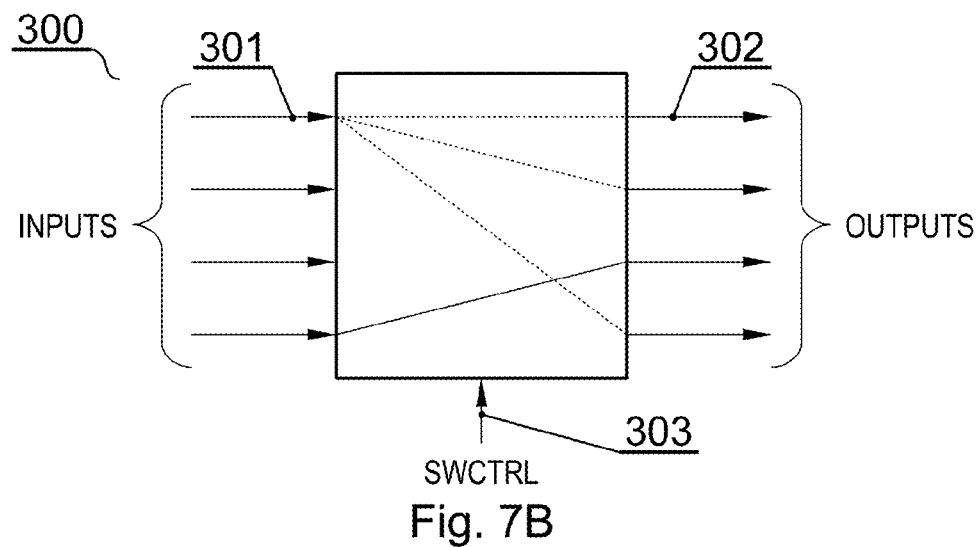
Figure 7C:
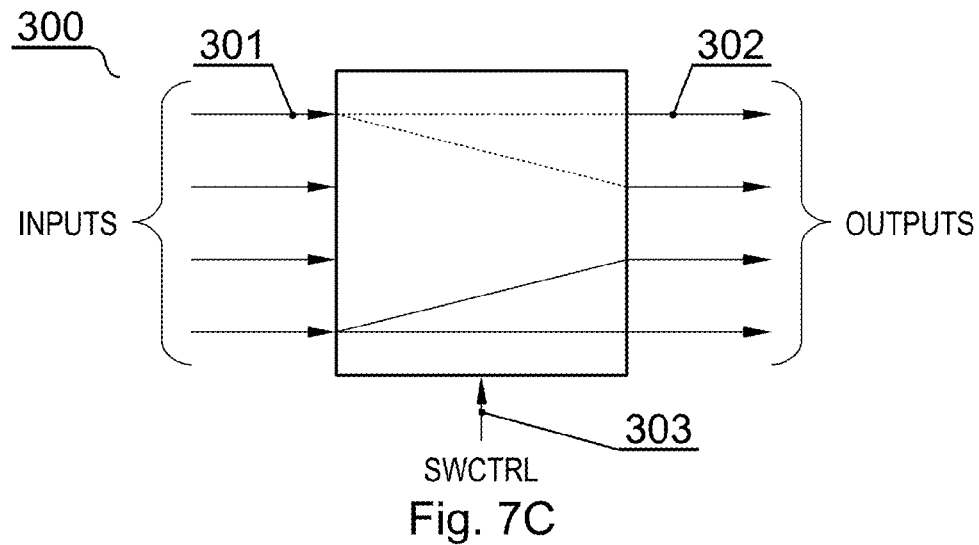
Figure 7D:
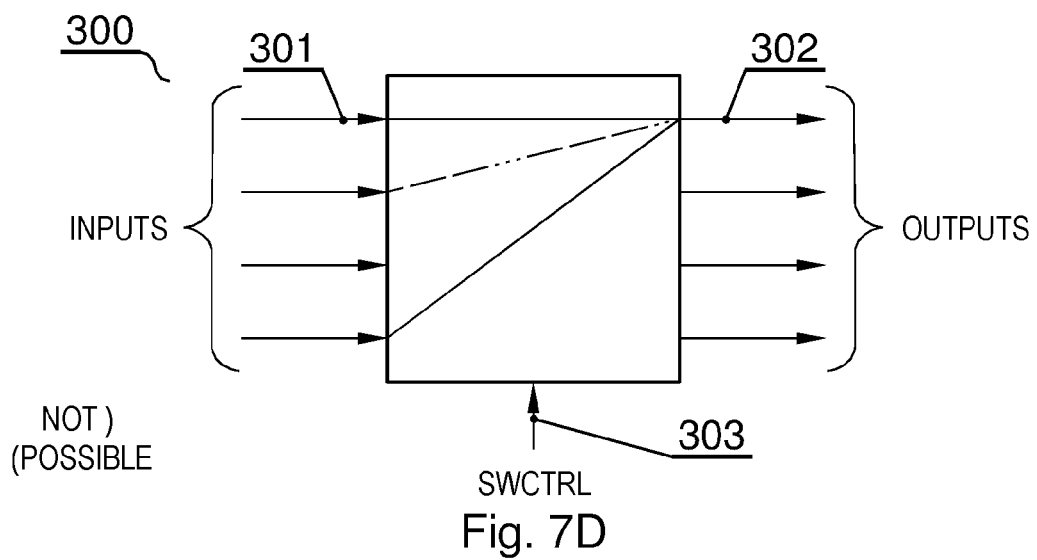

FIG. 7A depicts the Cross-bar Switch (300). The down-converted signals (e.g. 109) are further connected to the inputs (301) of the 4×4 Cross-bar Switch (300). The switch accepts four RF inputs, which can be routed to any of the four outputs (302), providing high-isolation between paths. The Cross-bar Switch may output the same input signal on one or more of its outputs (example on FIG. 7B and FIG. 7C), whereas it cannot output on one of its outputs more than one input signal (example on FIG. 7D). The switching is managed by the control signal SWCTRL (303) governed by the Controller (600).

A given Cross-bar Switch is a single layer, non-blocking type switch, which means that other concurrent connections do not prevent connecting other inputs to other outputs. According to the present invention, two Cross-bar Switches exist in order to cover two satellites independently.

Figure 8:
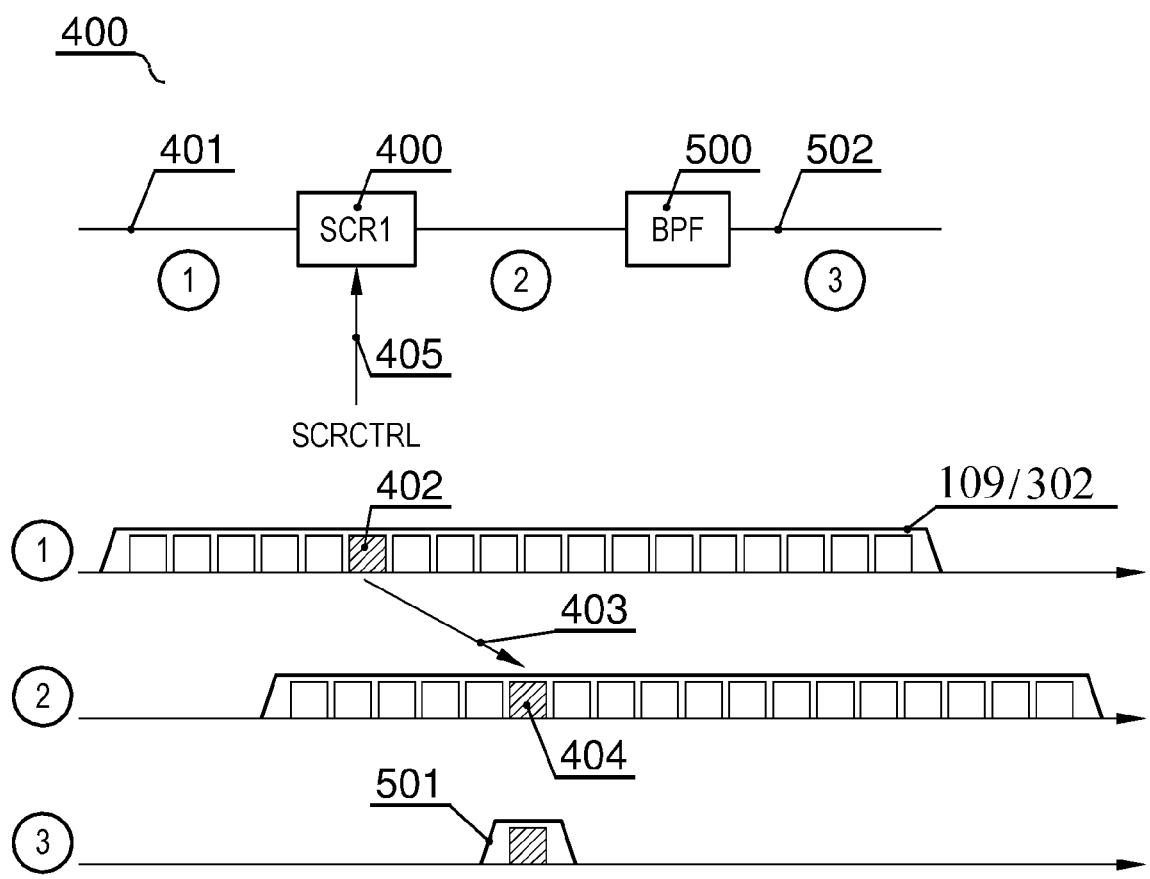
FIG. 8 presents a Satellite Channel Router.

Each output of the Cross-bar Switch (302) is further connected to the Satellite Channel Router input (401), depicted in FIG. 8. This device, governed by the Controller, shifts the frequency of any input signal to a fixed intermediate frequency. In practice it shifts (403) the receiver device requested transponder (402) comprising user requested channel, to the fixed frequency of User Band (404), which is further received by the tuner receiver.

As shown in FIG. 8, the entire frequency band (109) is shifted (403) over a specific frequency, which depends on user selected channel. In order to obtain a narrow User Band output (501) the signal is further filtered by a Band Pass Filter (500) in order to obtain an output signal (502).

Each output of the Cross-bar Switch is connected to a dedicated SCR device. Each individual SCR+BPF translates the incoming band into single transponder over different and unique frequency shift. The frequency shift depends on user request parameters, tuner device lock frequency in particular. All SCR operations are managed by the control signals SCRCTRL (405), governed by the Controller (600).

As a result, the SCR network output provides eight independent, narrow band outputs, comprising user requested transponders, each located on a different fixed frequency User Band (701-708).

According to the present invention, there are eight SCR devices, able to translate desired channels up to eight unique frequency locations (User Bands). Examples of fixed center frequencies of User Bands are following: 1076, 1178, 1280, 1382, 1484, 1586, 1688 and 1790 MHz. Nevertheless, other spread of the bands, over the complete band, may be used.

Figure 9:
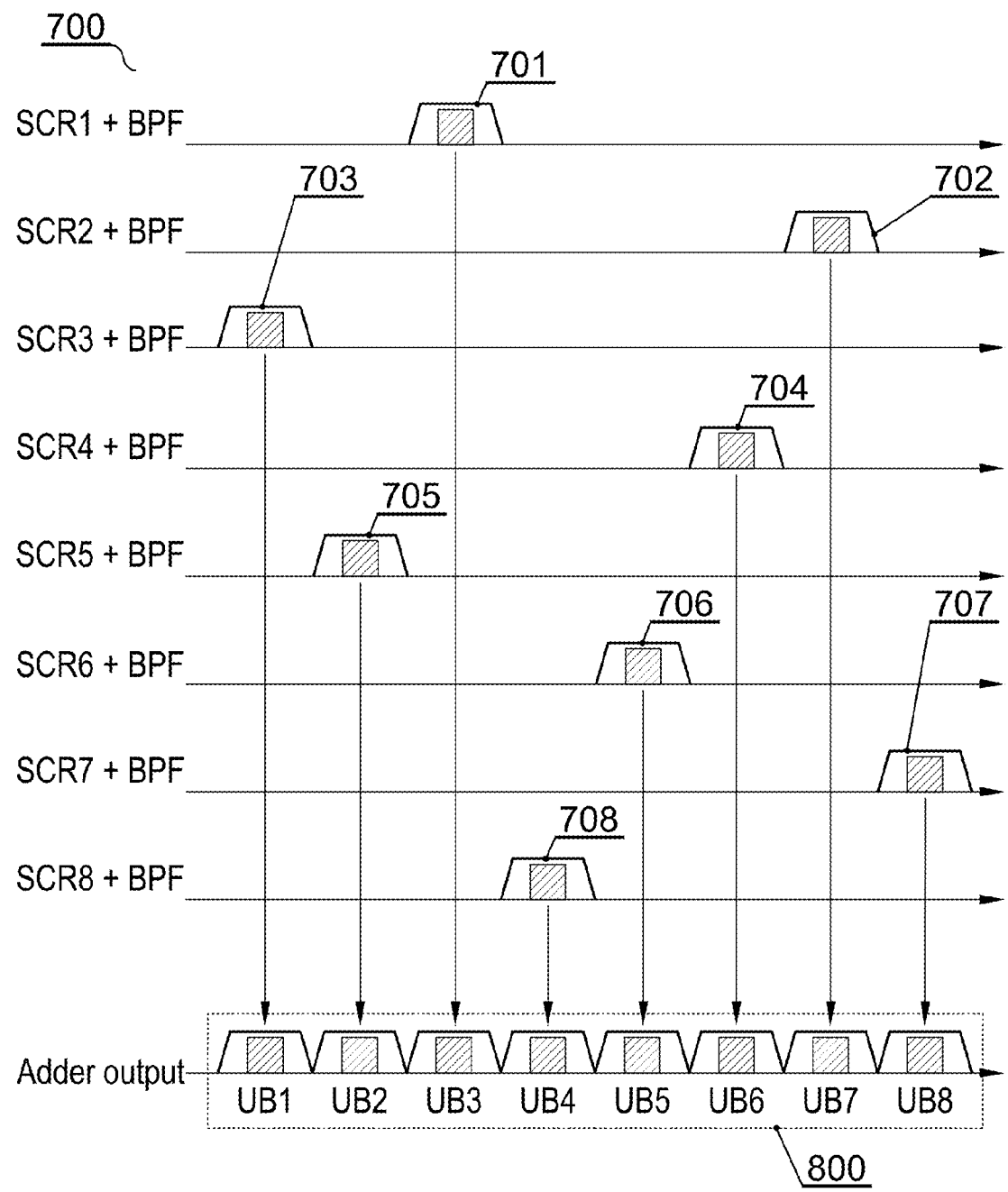
FIG. 9 shows an Adder.

FIG. 9 presents the Adder (700). Selected User Bands (701-708), comprising requested transponders data, are further processed by the Adder (700), which sums up the signals on different frequencies. As a result, on the Adder's output the signal comprises all User Band frequencies (800) combined and fed into a single coax cable (900).

Figure 10:
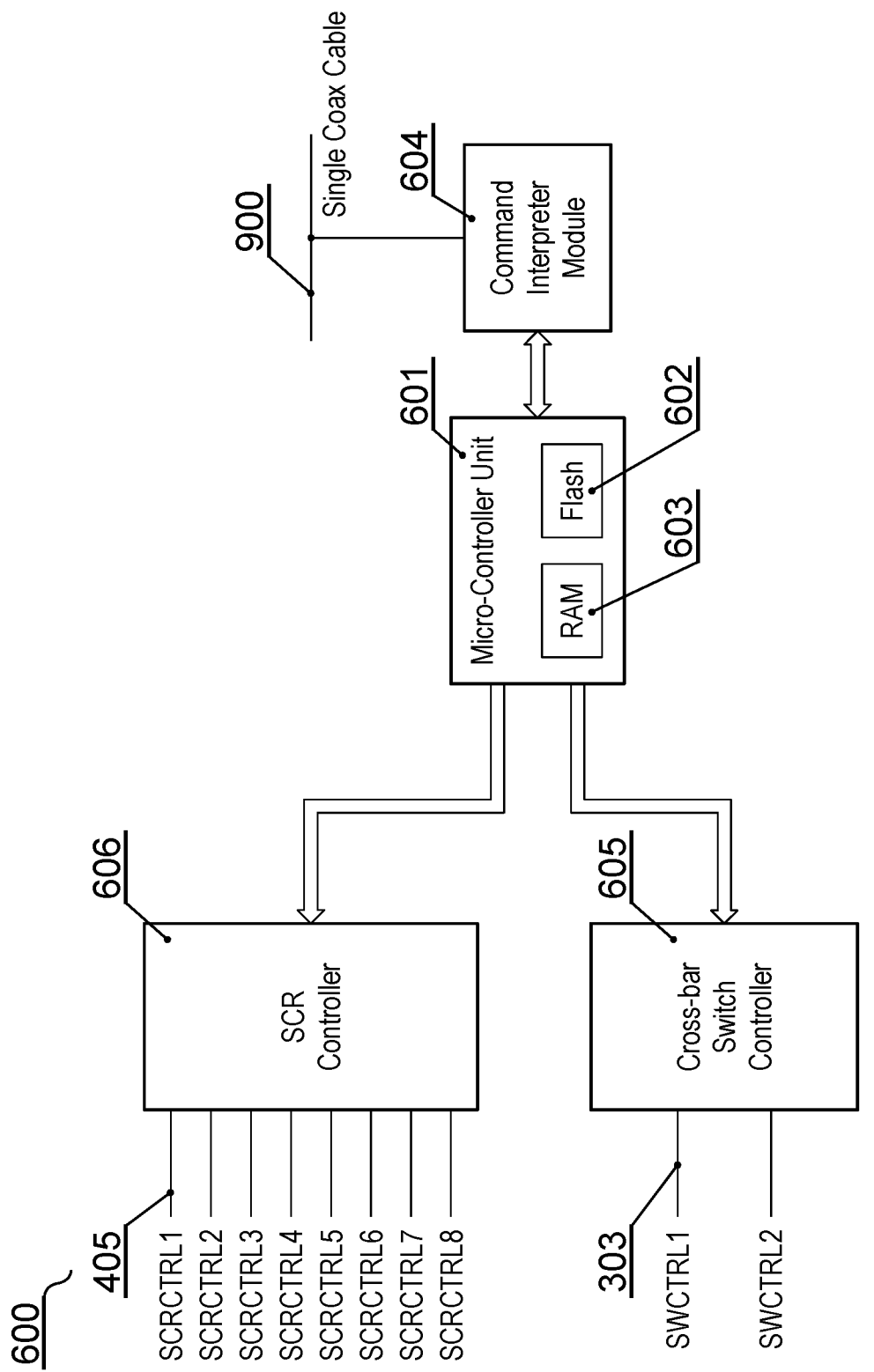
FIG. 10 depicts a Controller.

FIG. 10 presents the Controller (600) responsible for managing the whole process of channel selection and frequency shift. It preferably comprises several sub-modules responsible for various operations within the conversion process. The main device may be a Micro-Controller Unit MCU (601), comprising flash memory (602) in which software code is stored.

MCU boots the code from flash and executes it in RAM memory (603), which is also able to store temporary data required during code execution. Command Interpreter Module CIM (604) is responsible for interpretation of channel change request coming from external tuner device.

The channel change request is sent via DiSEqC commands, which are encoded on the signal present inside coax cable (900). DiSEqC uses a pulsed (tone-burst) 22 kHz sine-wave at 0.65 Vpp (±0.25 V), which is recognized by CIM. CIM decodes the request and adequately informs MCU about further actions to be taken.

Having interpreted DiSEqC command the MCU (601) requests accordingly via Cross-bar Switch Controller (605) the proper selection of the Cross-bar Switch input (301), which delivers appropriate down-converted Ku sub-band to the requested Cross-bar Switch output (302). Output selection depends on Tuner device lock frequency request and is related to SCR selection (400). According to the present invention, two SWCTRL control signals exist (303) in order to select each satellite independently.

Next, MCU requests to shift selected Ku sub-band to the proper frequency. This request is realized by the SCR Controller (606), which selects a desired SCR device (one out of eight in the SCR network, depending on a Tuner device lock request) and using SCRCTRL signal (405) it enables the appropriate frequency translation.

The Controller (600) may comprise or otherwise communicate with a memory, which may store computer program or programs executed by the aforementioned Controller (600), in order to execute steps of the method according to the present invention. Additionally, any configuration data of the system may be stored in said memory.

Figure 11A:
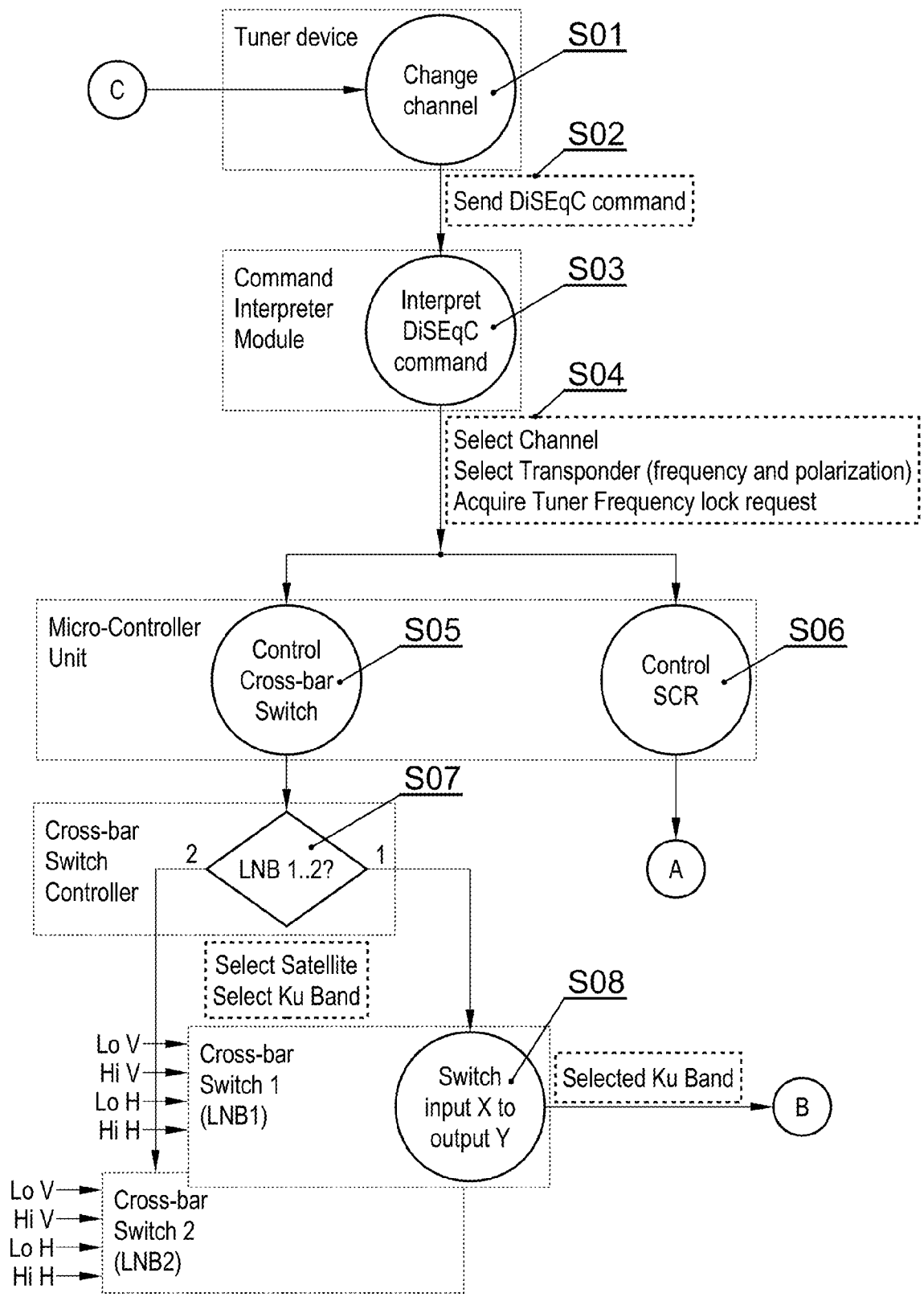
FIG. 11A-B show method of operation of the device shown in FIGS. 2-10.
Figure 11B:
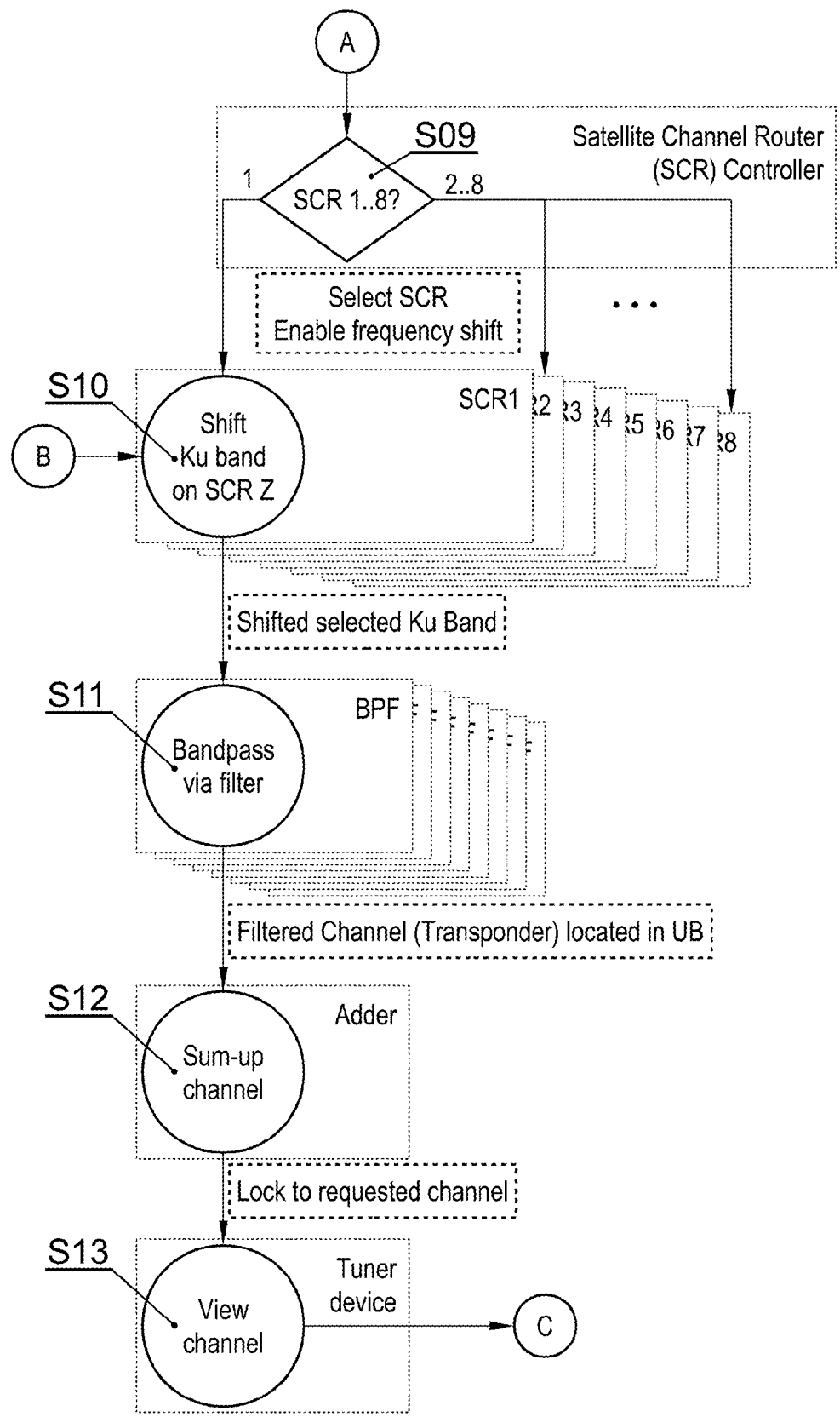

FIG. 11 presents method of operation of the device shown in FIGS. 2-10. A channel change request is initiated by an End User (S01), for example using a remote control unit of a set-top box. In response, a tuner device transmits an appropriate DiSEqC command over the coax cable (S02), which arrives at the Controller (600), in particular to the CIM module (604). The CIM module recognizes the command and interprets it (S03), which results in informing the Controller (600) about what channel change has been requested.

The Controller (600) acquires the parameters necessary for said channel change operation. These are mainly: satellite, frequency and polarization, determining desired transponder location (S04). Having these parameters, it allows the Controller (600) to select the desired channel within the first or second LNB block. An important parameter is also the tuner's lock frequency request, as it determines the latter frequency translation process within the SCR network (400).

Depending on the parameters, the Controller (600) manages respectively both the Cross-bar Switch Controller (S05) and the SCR Controller (S06). The Cross-bar switch Controller (605) is configured to select the desired Satellite (S07) as well as an appropriate Ku band (S08). This is realized by enabling a proper Cross-bar Switch input to the respective output. The Cross-bar Switch output selection is closely related to the choice of the SCR device, which is coherently selected at the same time depending on the Tuner lock frequency request parameter. The SCR Controller (606) selects an appropriate SCR (S09) and enables a frequency shift of the selected Ku band. The SCR device performs the translation process (S10) to the desired frequency.

Next, the signal passes through the corresponding Band Pass Filter (S11), which filters unnecessary output mixing products coming from frequency translation process and shapes the signal to a narrow band. Further the signal is summed-up by the Adder (S12) and arrives to the Tuner device, which is able to lock to the desired User Band frequency and view the user requested channel (S13).

Figure 12:
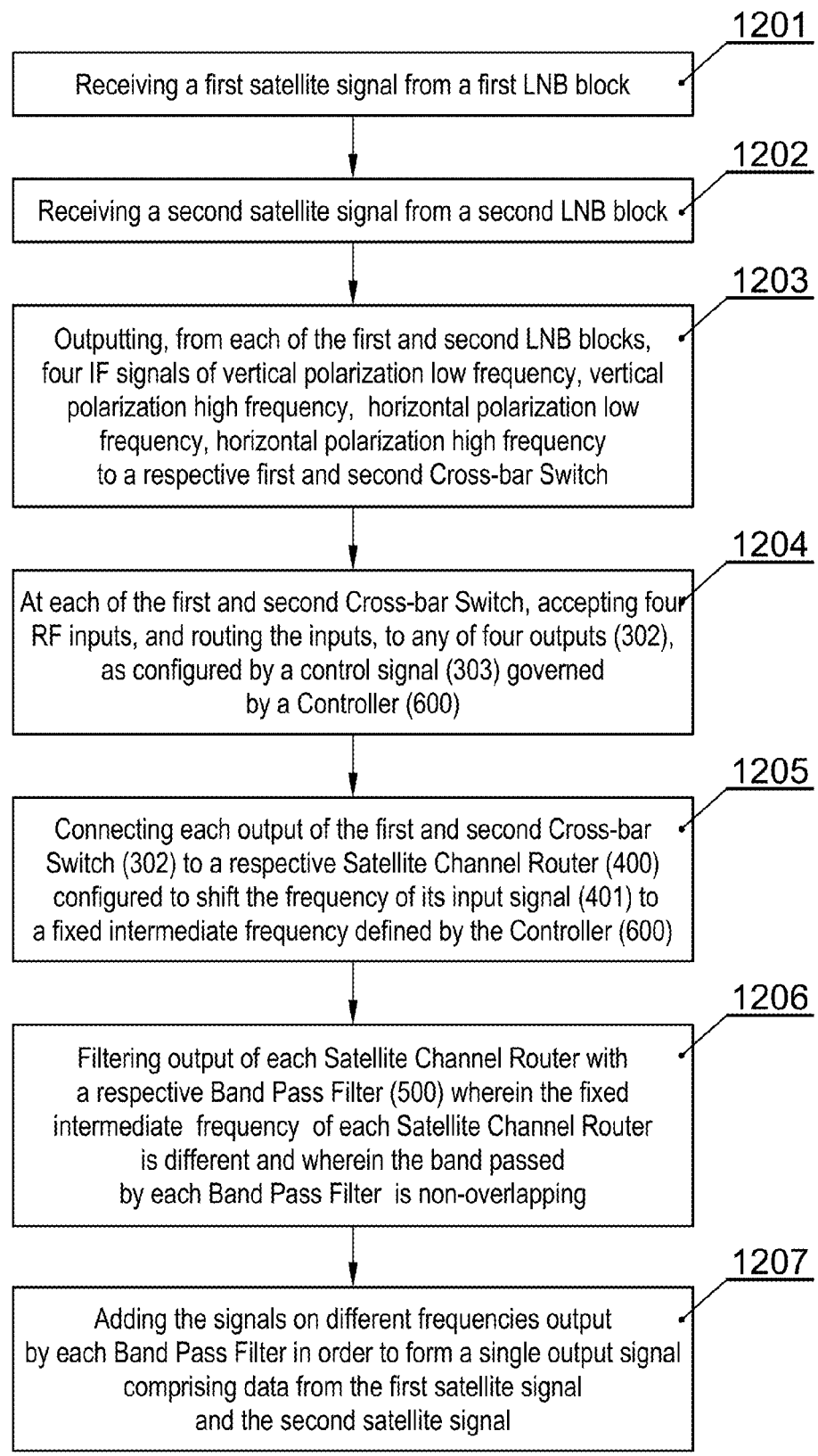
FIG. 12 shows a method according to the present invention.

FIG. 12 presents a diagram of the method according to the present invention. The method starts at step (1201) from receiving a first satellite signal from a first LNB block and receiving (1202) a second satellite signal from a second LNB block.

Subsequently, at step (1203) there is executed outputting, from each of the first and second LNB blocks, four IF signals of vertical polarization low frequency, vertical polarization high frequency, horizontal polarization low frequency, horizontal polarization high frequency to a respective first and second Cross-bar Switch.

Next, at each of the first and second Cross-bar Switch, the method accepts (1204) four RF inputs, and routing the inputs, to any of four outputs (302), as configured by a control signal (303) governed by a Controller (600), The method further comprises a step (1205) of connecting each output of the first and second Cross-bar Switch (302) to a respective Satellite Channel Router (400) configured by the Controller (600) to shift the frequency of its input signal (401) to a fixed intermediate frequency.

Subsequently, the method executes (1206) filtering output of each Satellite Channel Router with a respective Band Pass Filter (500) wherein the fixed intermediate frequency of each Satellite Channel Router is different and wherein the band passed by each Band Pass Filter is non-overlapping.

Finally, the method executes adding (1207), by an Adder (700), the signals on different frequencies output by each Band Pass Filter in order to form a single output signal comprising data from the first satellite signal and the second satellite signal.

The advantages of the present invention are: (A) reception of most popular for Europe satellite set Astra and HotBird via single cable; (B) a cost efficient connection of 2nd satellite via existing single cable in home (no cable installation upgrade needed); (C) easier installation of multiple tuner device receivers for 2nd satellite reception with only a single cable; (D) up to 8 different device receivers (tuners) per single cable (including combinations of multiple tuner devices with single tuner devices); (E) compatibility with existing Unicable accessories, ensuring easy and effective installations; (F) compatibility with daisy-chained connections along a single coax cable; (G) compatibility with standardized "plug and play" technology.

It can be easily recognized, by one skilled in the art, that the aforementioned method for operating an LNB may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for operating a low-noise block (LNB) downconverter, the method being characterized in that it comprises the steps of:
   receiving (1201) a first satellite signal from a first LNB block and receiving (1202) a second satellite signal from a second LNB block;
   outputting (1203), from each of the first and second LNB blocks, four IF signals of vertical polarization low frequency, vertical polarization high frequency, horizontal polarization low frequency, horizontal polarization high frequency to a respective first and second Cross-bar Switch;
   at each of the first and second Cross-bar Switch, accepting (1204) four RF inputs, and routing the inputs, to any of four outputs (302), as configured by a control signal (303) governed by a Controller (600);
   connecting (1205) each output of the first and second Cross-bar Switch (302) to a respective Satellite Channel Router (400) configured by the Controller (600) to shift the frequency of its input signal (401) to a fixed intermediate frequency;
   filtering (1206) output of each Satellite Channel Router with a respective Band Pass Filter (500) wherein the fixed intermediate frequency of each Satellite Channel Router is different and wherein the band passed by each Band Pass Filter is non-overlapping;
   adding (1207), by an Adder (700), the signals on different frequencies output by each Band Pass Filter in order to form a single output signal comprising data from the first satellite signal and the second satellite signal.

2. A low-noise block (LNB) downconverter characterized in that it comprises:
   a first LNB block configured to receive (1201) a first satellite signal and a second LNB block configured to receive (1202) a second satellite signal;
   the first and second LNB blocks being configured to output (1203), four IF signals of vertical polarization low frequency, vertical polarization high frequency, horizontal polarization low frequency, horizontal polarization high frequency to a respective first and second Cross-bar Switch;
   wherein the first and second Cross-bar Switch, are configured to accept (1204) four RF inputs, and routing the inputs, to any of four outputs (302), as configured by a control signal (303) governed by a Controller (600);
   wherein each output of the first and second Cross-bar Switch (302) is connected (1205) to a respective Satellite Channel Router (400) configured by the Controller (600) to shift the frequency of its input signal (401) to a fixed intermediate frequency;
   wherein (1206) output of each Satellite Channel Router is connected to a respective Band Pass Filter (500) whereas the fixed intermediate frequency of each Satellite Channel Router is different and wherein the band passed by each Band Pass Filter is non-overlapping;
   an Adder (700), configured to add (1207) the signals on different frequencies, output by each Band Pass Filter, in order to form a single output signal comprising data from the first satellite signal and the second satellite signal.

3. The low-noise block downconverter according to claim 2 characterized in that the single output signal is formed according to the Unicable technology.

4. The low-noise block downconverter according to claim 3 characterized in that the center frequencies of user bands are the following: 1076, 1178, 1280, 1382, 1484, 1586, 1688 and 1790 MHz.

5. The low-noise block downconverter according to claim 2 characterized in that the Controller (600) is configured to manage tuner's requests, satellite and transponder selection and channels allocation.

6. The low-noise block downconverter according to claim 2 characterized in that the first and second LNB blocks are identical.

7. The low-noise block downconverter according to claim 6 characterized in that the first and second LNB blocks are identical and each comprises a first and a second sub-LNB block (100, 200) with an alternate polarization.

8. The low-noise block downconverter according to claim 2 characterized in that the first and second Cross-bar Switch are each a single layer, non-blocking type switch.

9. The low-noise block downconverter according to claim 2 characterized in that each Satellite Channel Router is configured to shift (403) a receiver device requested transponder (402) comprising a user requested channel, to a fixed frequency of User Band (404), which is thereafter provided for reception by a tuner receiver.

10. The low-noise block downconverter according to claim 2 characterized in that the outputs of the Satellite Channel Routers provide eight independent narrow band outputs, comprising user requested transponders, each located on a different fixed frequency User Band (701-708).

11. The low-noise block downconverter according to claim 2 characterized in that the Controller (600) comprises a Command Interpreter Module CIM (604) configured to receive and interpret a channel change request from an external tuner device.

12. The low-noise block downconverter according to claim 11 characterized in that the channel change request is sent using DiSEqC commands.

13. The low-noise block downconverter according to claim 2 characterized in that each Band Pass Filter outputs a narrow band signal comprising a selected transponder's data.

* * * * *